United States Patent
Rotem et al.

(10) Patent No.: US 11,736,496 B2
(45) Date of Patent: *Aug. 22, 2023

(54) RESPONSIVE ACTIONS TO SUSPICIOUS E-MAIL, AS INFERRED FROM NEGATIVE USER ASSESSMENT, BY THIRD PARTY SECURITY SYSTEMS WITHOUT MODIFICATION OF EXISTING E-MAIL CLIENTS

(71) Applicant: Avanan Inc., Great Neck, NY (US)

(72) Inventors: Roy Rotem, Tel Aviv (IL); Gil Friedrich, Great Neck, NY (US)

(73) Assignee: AVANAN, INC., Great Neck, NY (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/176,424

(22) Filed: Feb. 16, 2021

(65) Prior Publication Data

US 2021/0258326 A1 Aug. 19, 2021

Related U.S. Application Data

(60) Provisional application No. 62/977,475, filed on Feb. 17, 2020.

(51) Int. Cl.
*H04L 9/40* (2022.01)
*H04L 51/212* (2022.01)
(Continued)

(52) U.S. Cl.
CPC .......... *H04L 63/1408* (2013.01); *G06F 9/541* (2013.01); *G06N 20/00* (2019.01);
(Continued)

(58) Field of Classification Search
CPC .............. H04L 63/1408; H04L 51/214; H04L 63/1441; H04L 51/212; G06N 20/00; G06F 9/541; G09B 19/0053
(Continued)

(56) References Cited

U.S. PATENT DOCUMENTS 10,187,407 B1 * 1/2019 Higbee ............... H04L 63/1433
10,819,744 B1 * 10/2020 Higbee ............... H04L 63/1433
(Continued)

OTHER PUBLICATIONS

Casey Inez Canfield, Quantifying Phishing Susceptibility for Detection and Behavior Decisions; Sagepub; Year:2016; pp. 1158-1172.*

*Primary Examiner* — Monjur Rahim
(74) *Attorney, Agent, or Firm* — Mark M. Friedman (57) ABSTRACT

A data security system, including a security manager computer making network application programming interface (API) calls to a cloud-based service that performs data exchange transactions among end users, the API calls remotely controlling the cloud-based service so that the security manager computer accesses transactions that have entered the cloud-based service, whereby an end user may forward a transaction received through the cloud-based service to a central authority as being a potentially harmful or deceptive transaction, and a data inspector operative to analyze a transaction as being indeed harmful or deceptive, by applying machine learning, wherein the security manager computer controls the cloud-based service so as to transmit to the security manager transactions forwarded to the central authority, instead of or in addition to transmitting these transactions to the central authority, for analysis by the data inspector.

12 Claims, 5 Drawing Sheets

(51) Int. Cl.
*G06F 9/54* (2006.01)
*G09B 19/00* (2006.01)
*G06N 20/00* (2019.01)
*H04L 51/42* (2022.01)
*H04L 51/214* (2022.01)

(52) U.S. Cl.
CPC ........ *G09B 19/0053* (2013.01); *H04L 51/212* (2022.05); *H04L 51/214* (2022.05); *H04L 51/42* (2022.05); *H04L 63/1441* (2013.01)

(58) Field of Classification Search
USPC .......................................................... 726/23
See application file for complete search history.

(56) References Cited

U.S. PATENT DOCUMENTS

| | | | |
|---|---|---|---|
| 11,005,860 B1* | 5/2021 | Glyer | H04L 63/1433 |
| 2010/0257598 A1* | 10/2010 | Demopoulos | H04L 63/1441 |
| | | | 726/13 |
| 2018/0255010 A1* | 9/2018 | Goyal | H04L 51/212 |
| 2018/0375877 A1* | 12/2018 | Jakobsson | G06F 16/955 |
| 2020/0250527 A1* | 8/2020 | Zhao | G06N 3/047 |

* cited by examiner

RESPONSIVE ACTIONS TO SUSPICIOUS E-MAIL, AS INFERRED FROM NEGATIVE USER ASSESSMENT, BY THIRD PARTY SECURITY SYSTEMS WITHOUT MODIFICATION OF EXISTING E-MAIL CLIENTS

PRIORITY REFERENCE TO PROVISIONAL APPLICATION

This application is a non-provisional of U.S. Provisional Application No. 62/977,475, entitled RESPONSIVE ACTIONS TO SUSPICIOUS E-MAIL, AS INFERRED FROM NEGATIVE USER ASSESSMENT, BY THIRD PARTY SECURITY SYSTEMS WITHOUT MODIFICATION OF EXISTING E-MAIL CLIENTS, and filed on Feb. 17, 2020 by inventors Roy Rotem and Gil Friedrich, the contents of which are hereby incorporated herein in their entirety.

FIELD OF THE INVENTION

The present invention relates to data security for e-mail services.

BACKGROUND OF THE INVENTION

A major threat to users and companies is harmful and deceptive e-mails. Proprietary data is compromised and computers are harmed when an unsuspecting user opens an e-mail or an e-mail attachment or opens a link that contains a computer virus, a phishing scheme or other malware.

Figure 1:
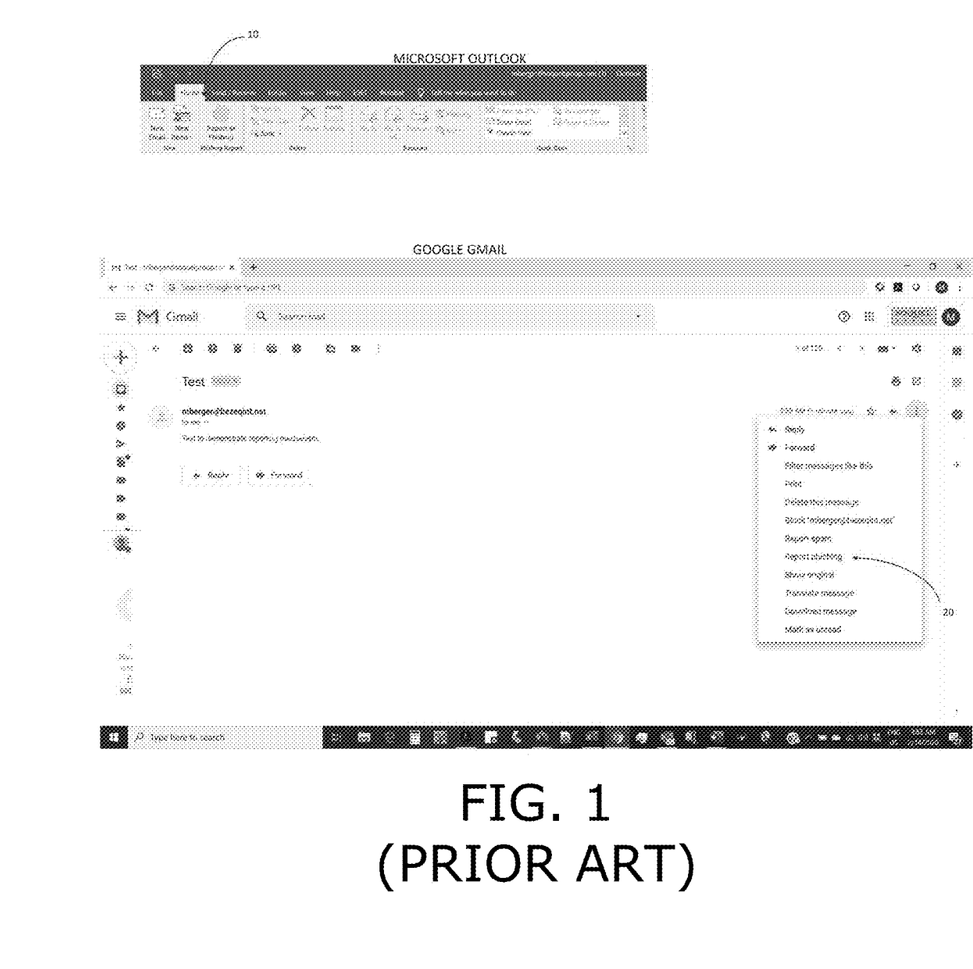
FIG. 1 is a prior art image of mechanisms in Microsoft Outlook and Google Gmail for reporting an e-mail as being potentially a phishing e-mail.

Many companies rely on local or cloud-based e-mail services such as Microsoft OFFICE 365® and Google GMAIL®, and are now training their employees to recognize potentially harmful or deceptive e-mails. Microsoft Office 365 enables a user to add a button to OUTLOOK® that reports potentially harmful or deceptive e-mails to Microsoft. Reference is made to FIG. 1, which is a prior art image of mechanisms in Microsoft Outlook and Google Gmail for reporting an e-mail as being potentially a phishing e-mail. FIG. 1 shows a ribbon at the top of Microsoft Outlook, with a button 10 for reporting an e-mail as being potentially a phishing e-mail. When a user pushes button 10, the reported e-mail is automatically forwarded to phish@office365.microsoft.com. FIG. 1 also shows a menu item 20 in Google Gmail for reporting an e-mail as being potentially a phishing e-mail.

Third party e-mail security vendors would like to have access to suspect e-mails submitted by users, in order to train their security inspection engines, and in order to take responsive actions such as blocking future e-mails from the same sender or from the sender's IP address or from the sender's Internet service provider (ISP). However, unless such a third party provides its own e-mail server and client, it must provide a custom Outlook or Gmail add-on which needs to be installed by its entire end user base.

It would thus be of advantage to have a way for third party e-mail security vendors to access e-mails reported by end users of Microsoft Office 365 and Google Gmail, or such other e-mail service, as being potentially harmful or deceptive, without the need for the end users to install custom add-ons to their e-mail clients.

SUMMARY

Embodiments of the present invention provide a system and method for third party e-mail security vendors to inspect and take action responsive to e-mails that are negatively assessed by end users through end user interaction, without the need for the end users to install custom add-ons to their native e-mail clients. Negative assessment refers to one or more end user actions indicating that an e-mail is undesirable. Thus a negatively assessed e-mail includes an e-mail that an end user deletes, marks as spam, moves to a junk folder, quarantines, forwards to an inspection center, or reports as potentially harmful or deceptive, or that an end user responds to by blocking the sender of the e-mail, or by taking such other form of rejection action indicating that the e-mail is undesirable.

Embodiments of the present invention thus enable third party e-mail security vendors to detect and take action responsive to phishing e-mails, and such other harmful or deceptive e-mails, while end users work in their natural modus operandi without any modification.

There is thus provided in accordance with an embodiment of the present invention a data security system, including a security manager computer making network application programming interface (API) calls to a cloud-based service that performs data exchange transactions for end users, the API calls remotely controlling the cloud-based service so as to identify end user actions indicating that a received transaction is negatively assessed, and to transmit the negatively assessed transaction, or transaction identification, to the security manager, and a data inspector operative to inspect a transaction as being harmful or deceptive, by applying machine learning, wherein the security manager re-trains the data inspector when a negatively-assessed transaction transmitted by the cloud-based service is determined to be harmful or deceptive, to improve the machine learning.

There is additionally provided in accordance with an embodiment of the present invention a data security system, including a security manager computer making network API calls to a cloud-based service that performs data exchange transactions for end users and that includes a mechanism for an end user to report a transaction received by the end user to a central authority as being a potentially harmful or deceptive transaction, and a data inspector operative to inspect a transaction as being harmful or deceptive, by applying machine learning, wherein the security manager computer controls the cloud-based service so as to transmit transactions reported by the mechanism, or transaction identifications, to the security manager, instead of or in addition to the central authority, for analysis by said data inspector, and wherein the security manager re-trains the data inspector when a transaction reported by the mechanism is determined to be harmful or deceptive, to improve the machine learning.

There is further provided in accordance with an embodiment of the present invention a method for data security, including making network API calls, by a security processor that applies machine learning to identify harmful or deceptive transactions, to a cloud-based service that performs data exchange transactions for end users, controlling the cloud-based service, via the API calls, so that the cloud-based server detects a transaction received by an end user and negatively assessed by the end user, based on actions performed by the end user indicative that the transaction is undesirable, further controlling the cloud-based service, via the API calls, so as to transmit the transaction negatively assed by the end user, or transaction identification, to the security processor, determining if the transaction is harmful or deceptive, and re-training the machine learning when the determining determines that the transmitted transaction is harmful or deceptive.

There is yet further provided in accordance with an embodiment of the present invention a method for data security, including making network API calls, by a security processor that applies machine learning to identify harmful or deceptive transactions, to a cloud-based service that performs data exchange transactions for end users and includes a mechanism for an end user to report a transaction received by the end user to a central authority as being a potentially harmful or deceptive transaction, controlling the cloud-based service, via the API calls, so as to transmit a transaction reported by the mechanism, or transaction identification, to the security processor instead of or in addition to the central authority, determining if the transaction is harmful or deceptive, and re-training the machine learning when the determining determines that the transaction reported by the mechanism is harmful or deceptive.

There is moreover provided in accordance with an embodiment of the present invention a data security system, including a security manager computer making network API calls to a cloud-based service that performs data exchange transactions among end users, the API calls remotely controlling the cloud-based service so that the security manager computer accesses transactions that have entered the cloud-based service, whereby an end user may forward a transaction received through the cloud-based service to a central authority as being a potentially harmful or deceptive transaction, and a data inspector operative to analyze a transaction as being indeed harmful or deceptive, by applying machine learning, wherein the security manager computer controls the cloud-based service so as to transmit to the security manager transactions forwarded to the central authority, instead of or in addition to transmitting these transactions to the central authority, for analysis by the data inspector.

There is additionally provided in accordance with an embodiment of the present invention a method for data security, including making network API calls, by a security processor, to a cloud-based service that performs data exchange transactions for end users, whereby an end user may forward a transaction received from the cloud-based service to a central authority as being a potentially harmful or deceptive transaction, controlling the cloud-based service, via the API calls, so as to transmit transactions forwarded by an end user to the central authority, to the security processor instead of or in addition to transmitting these transactions to the central authority, and applying, by the security processor, machine learning to the transactions forwarded by the end user to the central authority, to determine if the transactions are indeed harmful or deceptive.

There is further provided in accordance with an embodiment of the present invention a data security system, including a security manager computer making network application programming interface (API) calls to a cloud-based service that performs data exchange transactions for end users, the API calls remotely controlling the cloud-based service so that the security manager computer accesses transactions that have entered the cloud-based service, whereby an end user may forward a transaction received through the cloud-based service to a central authority as being a potentially harmful or deceptive transaction, and a data inspector operative to analyze a transaction as being indeed harmful or deceptive, by applying machine learning, wherein the security manager computer controls the cloud-based service so as to (i) intercept a transaction that is forwarded by a user to the central authority, and (ii) to identify the potentially harmful or deceptive transaction based at least on information in the intercepted transaction.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

| Table of elements in the figures | |
|---|---|
| Element | Description |
| 10 | button in Microsoft Outlook for reporting harmful e-mail |
| 20 | menu item in Google Gmail for reporting harmful e-mail |
| 100 | end users |
| 110 | end user computing devices |
| 120 | e-mail client |
| 130 | e-mail undesired by an end user |
| 140 | e-mail reported by an end user to be harmful |
| 200 | cloud computing center |
| 220 | cloud-based e-mail service |
| 300 | cloud security platform |
| 310 | security manager |
| 320 | data inspector |
| 400 | central reporting authority |

Elements numbered in the 1000's are operations of flow charts.

DETAILED DESCRIPTION

In accordance with embodiments of the present invention, security systems and methods are provided for inspecting and taking action responsive to e-mails negatively assessed by an end user as being undesirable, harmful and/or deceptive.

Figure 2:
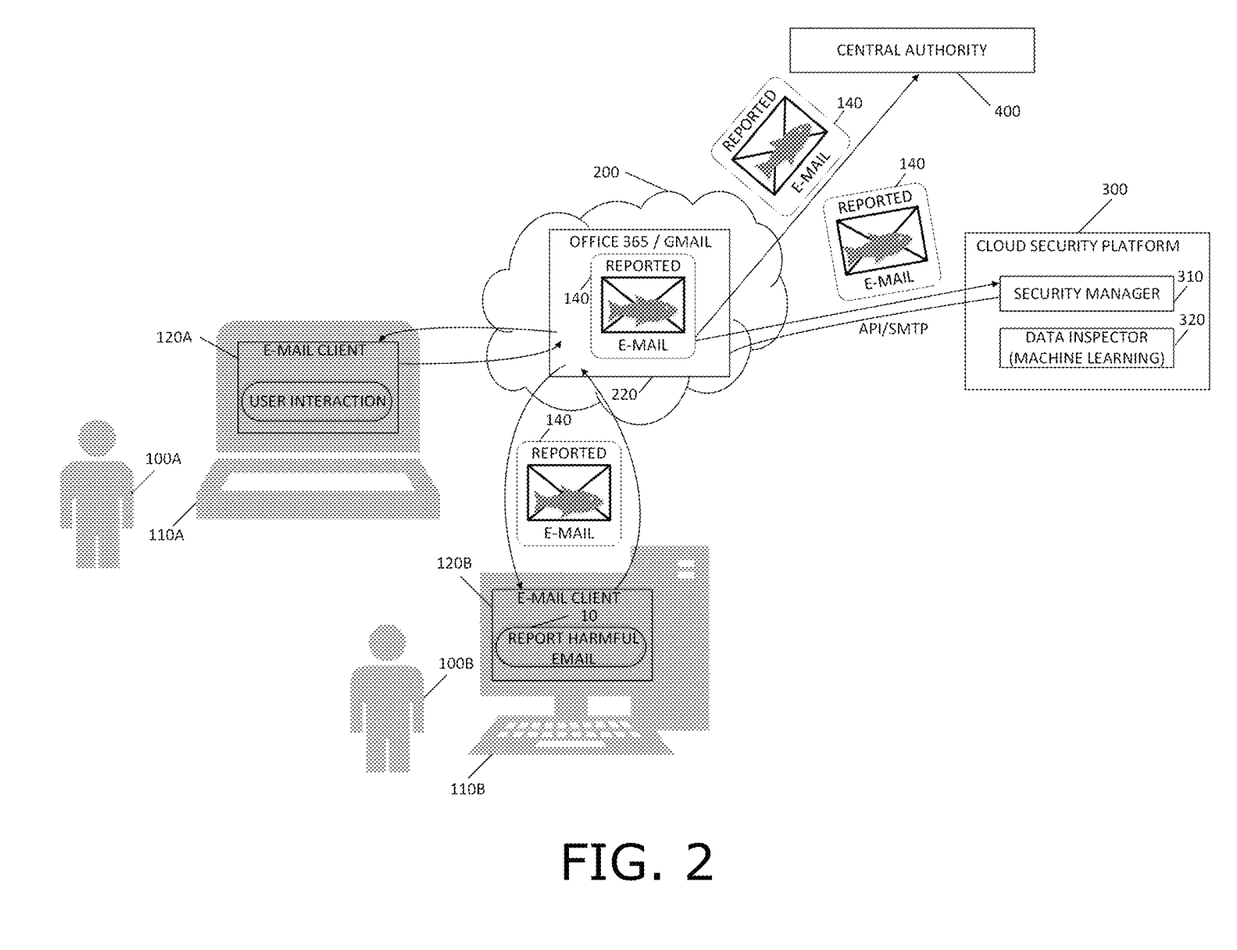
FIG. 2 is a simplified block diagram of a data security system that intercepts and takes action responsive to e-mails reported by an end user as being harmful or deceptive, in accordance with an embodiment of the present invention.

Reference is made to FIG. 2, which is a simplified block diagram of a data security system that intercepts and takes action responsive to e-mails reported by an end user as being harmful or deceptive, in accordance with an embodiment of the present invention. Shown in FIG. 2 are end users 100A and 100B who access cloud-based e-mail service 220, such as OFFICE 365® developed by Microsoft Corporation of Redmond, Wash., USA, and GMAIL® developed by Google Inc. of Mountain View, Calif., USA, that run in a cloud computing center 200. End users 100A and 100B access service 220 using any of a variety of respective computing devices 110A and 1108, including inter alia a laptop computer, a desktop computer, and a smartphone. Each computing device 110A and 1108 incudes a respective local e-mail client 120A and 120B installed thereon, for sending and receiving e-mails via service 220. FIG. 2 shows E-mail client 120B including a button 10, for end user 100B to report a received e-mail as being potentially harmful and/or deceptive. FIG. 2 shows end user 100A interacting with his e-mail, and end user 100B reporting an e-mail 140 as being potentially harmful and/or deceptive; e.g., a phishing e-mail.

Also shown in FIG. 2 is a cloud security platform 300, including a security manager 310 and a data inspector 320. Security manager 300 remotely accesses e-mail service 220 using the service's application programming interface (API). Security platform 300 may itself be a cloud-based system. Security manager 310 and data inspector 320 may or may not reside on the same computer or even within the same cloud. Data inspector 320 may be, for example, its own cloud service.

As described in co-assigned U.S. Pat. No. 10,372,931, the contents of which are hereby incorporated in their entirety by reference, security manager 310 and data inspector 320 protect end user computing devices 110A and 1108 from incoming e-mails that are harmful and/or deceptive. In addition, security manager 310 and data inspector 320 include programmable data processing, storage and communication circuitry for performing the operations described below with reference to the flowcharts of FIGS. 4 and 5.

In an embodiment of the present invention, security manager 310, when initially installed in an enterprise that uses e-mail service 220, uses the API of e-mail service 220 to configure the service to automatically forward e-mails or e-mail identifiers, or such other data, to security manager 310.

Data inspector 320 may use a variety of methods to inspect suspicious e-mails as being harmful and/or deceptive. Harmful and/or deceptive e-mails include inter alia phishing e-mails and e-mails with malware links and/or attachments. In one embodiment of the present invention, data inspector 320 applies machine learning. Using training sets of e-mails, data inspector 320 learns to identify phishing e-mails and e-mails with malware links and/or attachments, and optionally spam and junk e-mails. Data inspector 320 quarantines harmful and/or deceptive e-mails, and blocks them from reaching end user computers 110A and 1108. Security manager 310 reports harmful and/or deceptive e-mail to an administrator of an enterprise that uses e-mail service 220.

When end user 100A interacts with an e-mail 130 (FIG. 3) in a way that indicates a negative assessment, the interaction is reported to e-mail service 220. In accordance with an embodiment of the present invention, security manager 310 monitors e-mail service 220 for such interaction, and controls e-mail service 220 to forward e-mail 130, or e-mail 130 identification, to security service 310.

When user 100B reports a suspicious e-mail 140 using button 10, the e-mail is forwarded to a central authority 400, such as phish@office365.microsoft.com. However, in accordance with an embodiment of the present invention, security manager 310 controls e-mail service 220 so that e-mail service 220 forwards reported e-mail 140, or reported e-mail 140 identification, to security manager 310 instead of or in addition to central authority 400. Security manager 310 then determines if e-mail 140 is harmful and/or deceptive. Security manager 310 notifies an administrator of an enterprise that uses e-mail service 220, of the reported e-mail.

FIG. 2 shows e-mail 140 being transmitted from e-mail client 120B to e-mail service 220. However, it will be appreciated by those skilled in the art that in an alternative embodiment, e-mail service 220 already has a copy of e-mail 140, in which case transmission of e-mail 140 from e-mail client 120B to e-mail service 220 is avoided.

If security manager 310 determines that e-mail 130 negatively assessed by end user 100A, or e-mail 140 reported by user 100B is harmful and/or deceptive, then one or more responsive actions are taken. One responsive action is to block further e-mails originating from the same sender, or from the sender's IP address or a similar IP address, or from the sender's Internet service provider (ISP).

Another responsive action is to re-train data inspector 320 using negatively assessed e-mail 130 and reported e-mail 140 as part of a training set. Indeed, if e-mail 130 is negatively assessed by end user 100A, or if e-mail 140 reported by user 100B is harmful and/or deceptive, then data inspector 320 should have blocked it from reaching respective computing devices 110A or 1108 in the first place. The fact that e-mail 130 or 140 reached respective computing device 110A or 1108 indicates a flaw in data inspector 320. Re-training data inspector 320 is a way to correct this flaw.

Another responsive action, referred to as "search and destroy", to protect an enterprise that uses e-mail service 220, is to search for e-mails similar to e-mail 140, throughout all users within the enterprise, and to destroy those e-mails. It is likely that e-mails from the same sender of e-mail 140, or sender IP address, have been received by other users within the enterprise, who did not report them. These e-mails may also be harmful and/or deceptive.

Figure 3:
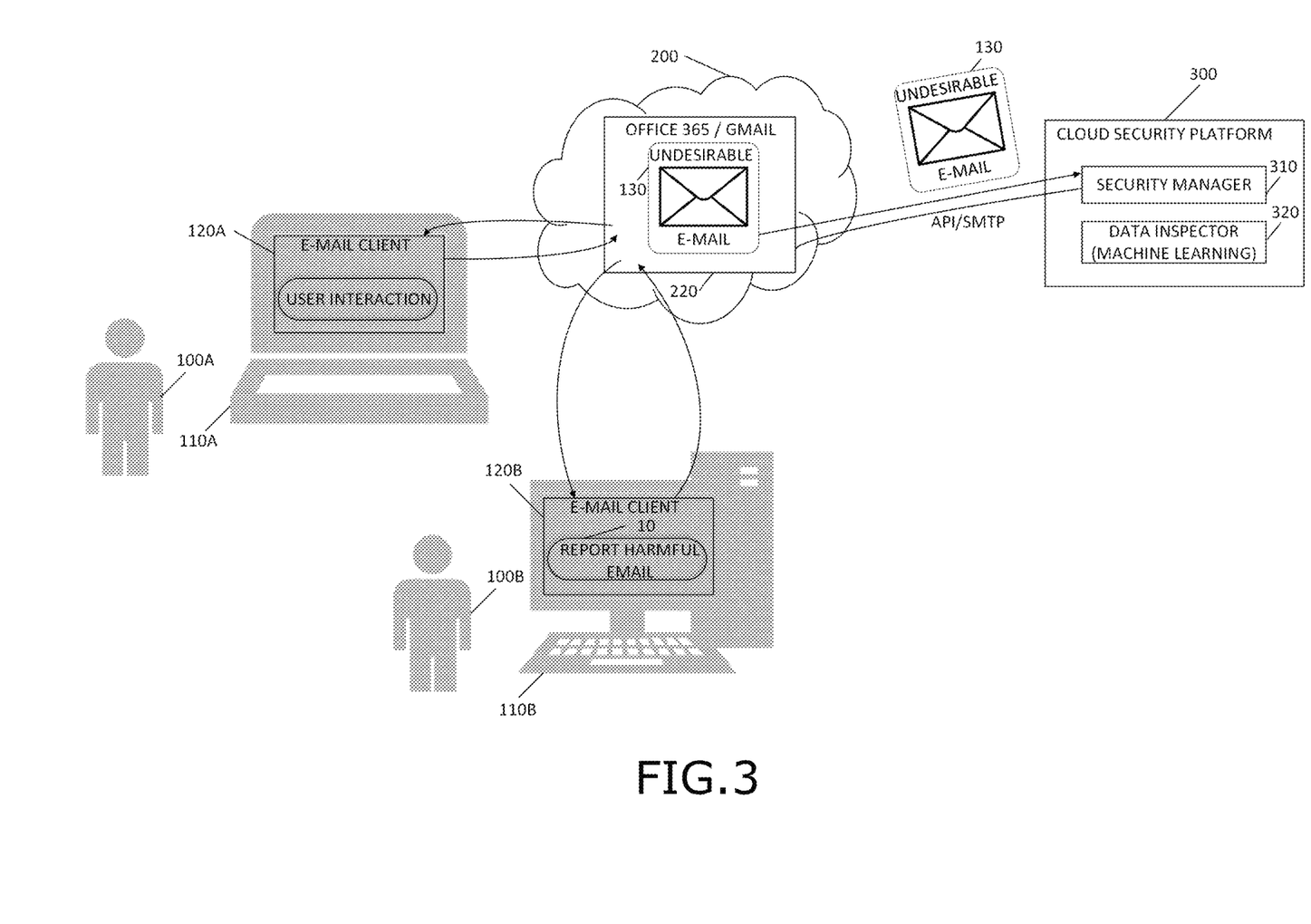
FIG. 3 is a simplified block diagram of a data security system that inspects and takes action responsive to e-mails that are negatively assessed by an end user, in accordance with an embodiment of the present invention.

Reference is made to FIG. 3, which is a simplified block diagram of a data security system that inspects and takes action responsive to e-mails that are negatively assessed by an end user, in accordance with an embodiment of the present invention. FIG. 3 is a variant of FIG. 2, in which end user 100A interacts with e-mail 130 in a way indicative that e-mail 130 is undesirable. The actions of end user 100A are transmitted to e-mail service 220, and security manager 310 detects these actions via network API calls to e-mail service 220. In response, security manager 310 causes e-mail service 220 to send undesirable e-mail 130, or e-mail 130 identification, to security manager 310. Security manager 310 is then able to analyze undesirable e-mail 130 to determine if undesirable e-mail 130 is harmful or deceptive, and, if so, one or more responsive actions are taken as described hereinabove.

FIG. 3 shows e-mail 130 being transmitted from e-mail service 220 to security manager 310. However, it will be appreciated by those skilled in the art that in an alternative embodiment, e-mail service 220 may not have a copy of e-mail 130, in which case e-mail client 120A first transmits e-mail 130 to e-mail service 220.

Figure 4:
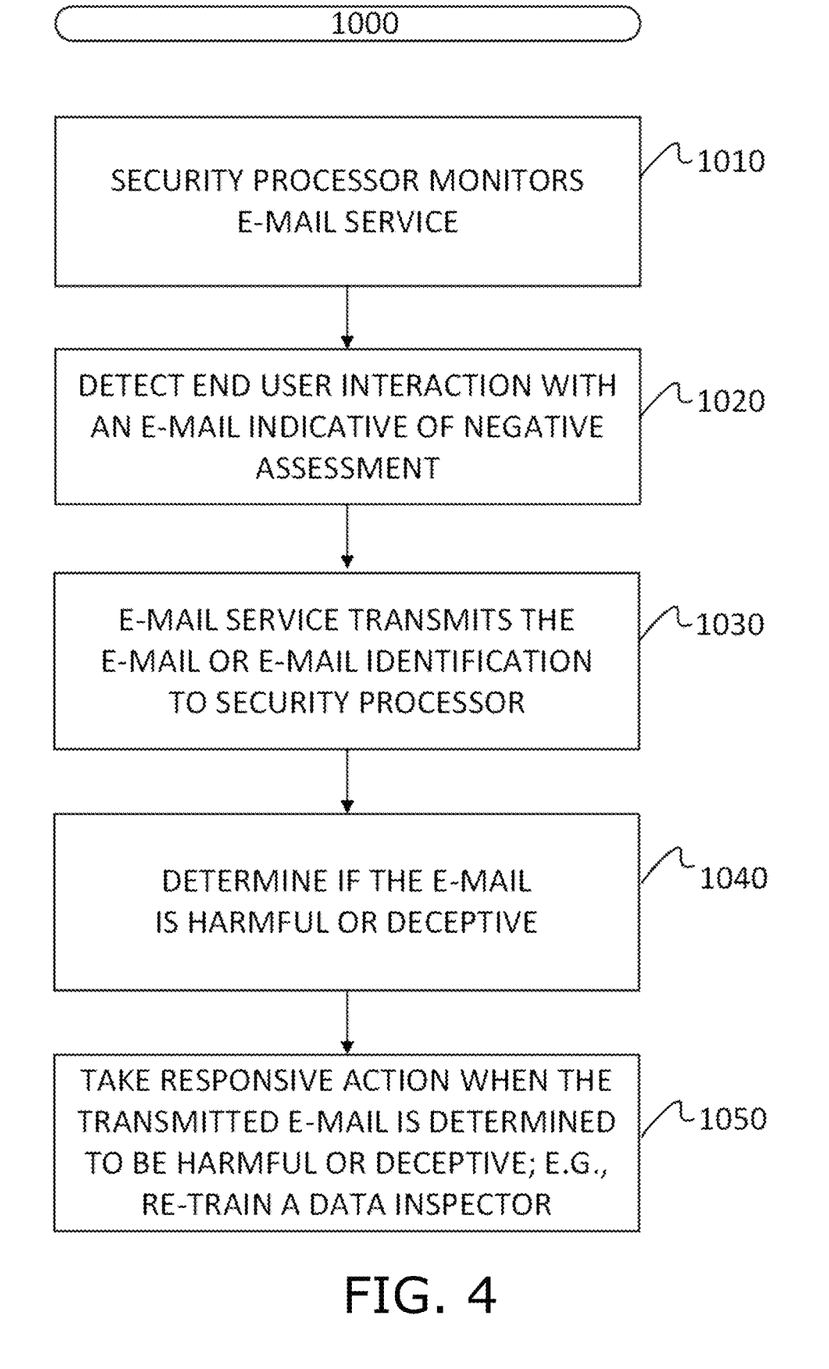
FIG. 4 is a simplified flowchart of a method for data security that inspects and takes action responsive to e-mails that are negatively assessed by an end user, in accordance with an embodiment of the present invention.

Reference is made to FIG. 4, which is a simplified flowchart of a method for data security that inspects and takes action responsive to e-mails that are negatively assessed by an end user, in accordance with an embodiment of the present invention. Method 1000 is practiced by security manager 310 and data inspector 320, to provide security for end users 100A and 1008.

At operation 1010 security manager 310 monitors e-mail service 220. At operation 1020 security manager 310 detects end user 100A interaction with an e-mail 130 indicative of negative assessment; i.e., that e-mail 130 is undesirable. For example, end user 100A may delete e-mail 130, mark e-mail 130 as spam, move e-mail 130 to a junk folder, quarantine e-mail 130, forward e-mail 130 to an inspection center, report e-mail 130 as being potentially harmful or deceptive, block the sender of e-mail 130, or take such other form of rejection action indicating that e-mail 130 is undesirable.

At operation 1030 e-mail service 220 transmits e-mail 130 to security manager 310. Security manager 310 controls service 220 using a network API, which causes e-mail service 220 to identify that e-mail 130 is negatively assessed by end user 100A and to forward e-mail 130 to security manager 310. At operation 1040 security manager 310 inspects e-mail 130 to determine if e-mail 130 is harmful and/or deceptive. If security manager 310 determines that e-mail 130 is harmful or deceptive, then at operation 1050 security manager 310 causes a responsive action to be performed. The responsive action may include re-training data inspector 320 using e-mail 130. The responsive action may include blocking future e-mails from the sender of e-mail 130, or from the sender's IP address or a similar IP address, or from the sender's ISP. The responsive action may include reporting e-mail 130 to an administrator of an enterprise that uses e-mail service 220. The responsive action may include searching and destroying other e-mails received by users of the enterprise from the same sender of e-mail 130 or from the same sender IP address or similar IP address, as described hereinabove with reference to FIG. 2.

Figure 5:
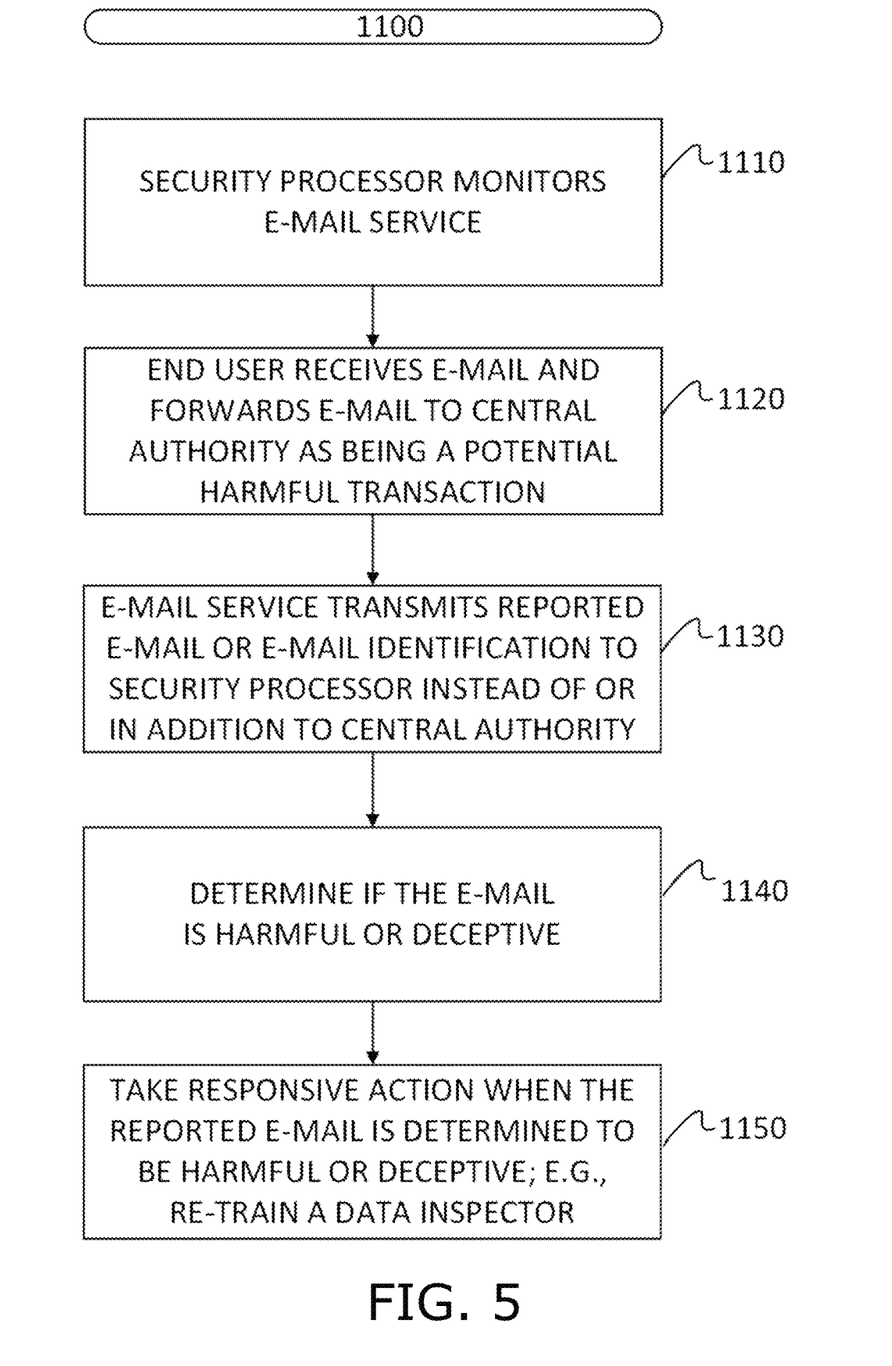
FIG. 5 is a simplified flowchart of a method for data security that intercepts and takes action responsive to e-mails reported by an end user as being harmful or deceptive, in accordance with an embodiment of the present invention.

Reference is made to FIG. 5, which is a simplified flowchart of a method for data security that intercepts and takes action responsive to e-mails reported by an end user as being harmful or deceptive, in accordance with an embodiment of the present invention. Method 1100 is practiced by security manager 310 and data inspector 320, to provide security for end users 100A and 1008.

At operation 1110 security manager 310 monitors e-mail service 220. At operation 1120 end user 1108 receives an e-mail 140 that appears to be harmful, and clicks on button 10 to forward e-mail 140 to central authority 400. At operation 1130 service 220 transmits e-mail 140 to security manager 310 instead of or in addition to central authority 400. Security manager 310 controls service 220 using a network API, which causes service 220 to identify e-mails being forwarded to central authority 400 and to forward them to security manager 310 instead of or in addition to central authority 400. At operation 1140 security manager 310 inspects e-mail 140 to determine if it is harmful and/or deceptive. If security manager 310 determines that e-mail 140 is harmful or deceptive, then at operation 1150 security manager 310 causes a remedial action to be performed. The remedial action may include re-training data inspector 320 using e-mail 140 as part of its training set. The remedial action may include blocking future e-mails from the sender of e-mail 140, or from the sender's IP address or similar IP address, or from the sender's ISP. The responsive action may include reporting e-mail 130 to an administrator of an enterprise that uses e-mail service 220.

Embodiments of the present invention provide systems and methods for third party security vendors, such as cloud security platform 300 (FIGS. 2 and 3), the capability to inspect and take responsive action to undesirable e-mails that reach end users 100A and 1008, and use them to train data inspector 320 to better protect end users 100A and 1008. This capability is provided without modification of the end users' e-mail clients 120A and 120B, whether they be Outlook clients or Gmail clients or such other clients not provided by the third party security vendors.

It will be appreciated by those skilled in the art that there are many alternative embodiments of the present invention.

In one alternative embodiment, end users 100A and 100B use a web-based e-mail client provided by and located at e-mail service 220, instead of local e-mail clients, and button 10 is part of the web-based e-mail client.

In another alternative embodiment, button 10 may be replaced with one or more other reporting mechanisms, including inter alia a right-click menu option, a control within a displayed e-mail, a voice-activated command, a physical button, e.g., on a smartphone, or such other mechanism used now or in the future for reporting an e-mail suspected of being phishing, harmful or deceptive.

In yet another alternative embodiment, security manager 310 controls e-mail service 220 by creating platform rules that cause e-mail service 220 to transmit undesirable e-mail 130 and reported e-mail 140 to security manager 310. Furthermore, the platform rules may cause e-mail service 220 to automatically detect end user actions indicative of negative assessment of an e-mail, and transmit the e-mail to security manager 310, without any further intervention on the part of security manager 310.

It will further be appreciated by those skilled in the art that the present invention has widespread application to other cloud-based services that provide data exchange transactions, such as document exchange services, in addition to the e-mail services described hereinabove.

Embodiments of the present invention provide many advantages vis-à-vis conventional enterprise security systems. Because these embodiments are network-API-based, they do not rely on a proxy and are not inline. They are immediately deployable and do not require changes to an enterprise network configuration, nor to end user e-mail clients. They do not require installation of an add-on for a reporting mechanism to end user e-mail clients, but rather make use of existing reporting mechanisms and native user behavior.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A data security system, comprising:
 a security manager computer making network application programming interface (API) calls to a cloud-based service that performs data exchange transactions among end users, the API calls remotely controlling the cloud-based service so that the security manager computer accesses transactions that have entered the cloud-based service, wherein an end user may forward a transaction received through the cloud-based service to a central authority as being a potentially harmful or deceptive transaction; and
 a data inspector operative to analyze a transaction as being indeed harmful or deceptive,
 wherein said security manager computer controls the cloud-based service to transmit to said security manager transactions forwarded to the central authority, instead of or in addition to transmitting these transactions to the central authority, for analysis by said data inspector, and
 wherein said security manager computer controls the cloud-based service by generating one or more security platform rules that are applied by the cloud-based service and cause the cloud-based service to automatically transmit a transaction forwarded by an end user to the central authority, to the security processor, instead of or in addition to transmitting the transaction to the central authority.

2. The system of claim 1 wherein the potentially harmful or deceptive transaction is a training transaction, used to train end users how to identify potential security breaches.

3. A method for data security, comprising:
making network application programming interface (API) calls, by a security processor, to a cloud-based service that performs data exchange transactions for end users, wherein an end user may forward a transaction received from the cloud-based service to a central authority as being a potentially harmful or deceptive transaction;
controlling the cloud-based service, via the API calls, to transmit one or more transactions forwarded by an end user to the central authority, to the security processor instead of or in addition to transmitting these one or more transactions to the central authority, wherein said controlling the cloud-based service comprises generating one or more security platform rules that are applied by the cloud-based service and cause the cloud-based service to automatically transmit the one or more transactions forwarded by an end user to the central authority, to the security processor, instead of or in addition to transmitting the transaction to the central authority; and
analyzing, by the security processor, the one or more transactions forwarded by the end user to the central authority, to determine if the one or more transactions are indeed harmful or deceptive.

4. The method of claim 3, wherein the analyzing the one or more transactions includes applying machine learning.

5. The method of claim 3 further comprising identifying an end user who forwarded a transaction to the central authority, to report a potentially harmful or deceptive transaction.

6. The method of claim 3 further comprising identifying a security breach when said analyzing determines that a transaction forwarded by the user to the central authority is indeed harmful or deceptive.

7. The method of claim 3 further comprising blocking incoming transactions from the sender of the transaction forwarded by the end user, or from the sender's IP address, or from the sender's Internet service provider, when said analyzing determines that the one or more transactions forwarded by the end user is indeed harmful or deceptive.

8. A data security system, comprising:
a security manager computer making network application programming interface (API) calls to a cloud-based service that performs data exchange transactions for end users, the API calls remotely controlling the cloud-based service so that the security manager computer accesses transactions that have entered the cloud-based service, wherein an end user may forward a transaction received through the cloud-based service to a central authority as being a potentially harmful or deceptive transaction; and
a data inspector operative to analyze a transaction as being indeed harmful or deceptive,
wherein said security manager computer controls the cloud-based service to: (i) intercept a transaction that is forwarded by a user to the central authority, and (ii) identify the potentially harmful or deceptive transaction based at least on information in the intercepted transaction, and
wherein said security manager computer controls the cloud-based service by generating one or more security platform rules that are applied by the cloud-based service and cause the cloud-based service to automatically transmit a transaction forwarded by an end user to the central authority, to the security processor, instead of or in addition to transmitting the transaction to the central authority.

9. The system of claim 8 wherein the potentially harmful or deceptive transaction is a training transaction, used to train end users how to identify potential security breaches.

10. The data security system of claim 1, wherein the data inspector is operative to analyze a transaction as being indeed harmful or deceptive, by applying machine learning.

11. The method of claim 4, further comprising re-training the machine learning when said analyzing determines that the one or more transactions forwarded by the end user to the central authority are indeed harmful or deceptive.

12. The data security system of claim 8, wherein the data inspector is operative to analyze a transaction as being indeed harmful or deceptive, by applying machine learning.

* * * * *